Aug. 21, 1928.
A. W. BURKE
1,681,722
CIRCUIT CONTROLLER
Original Filed Aug. 13, 1921   2 Sheets-Sheet 1
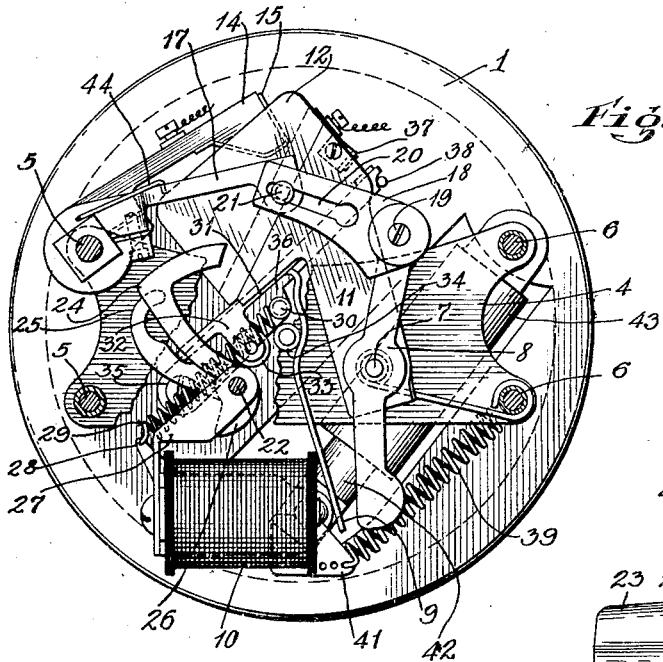
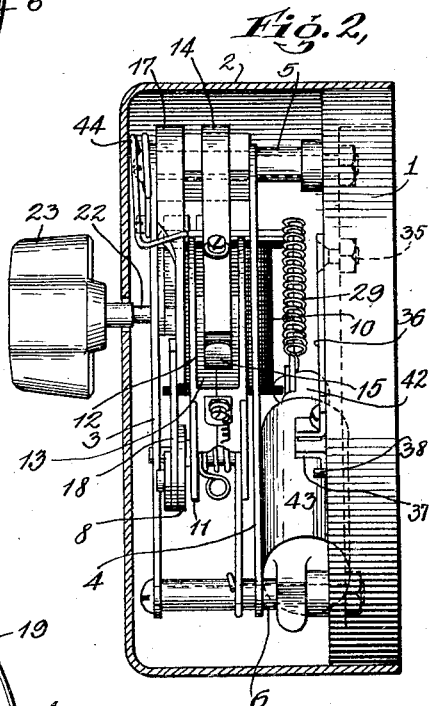
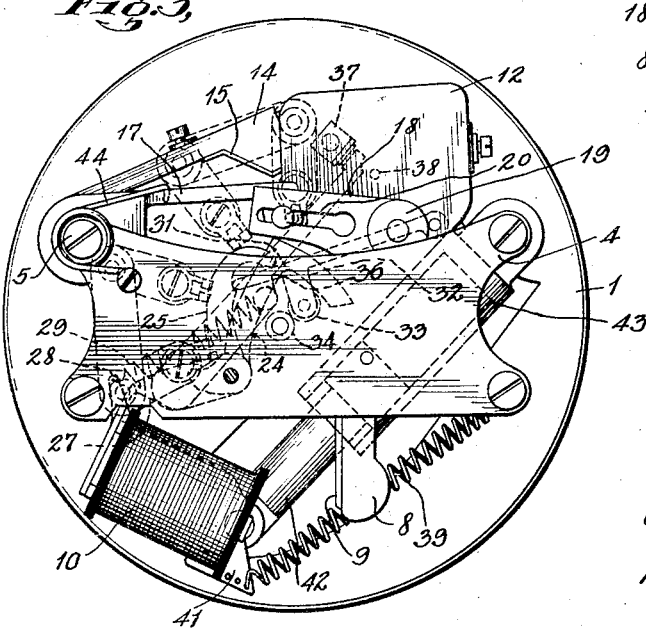
INVENTOR
Alfred W. Burke
BY
Kiddle and Margeson
ATTORNEYS.

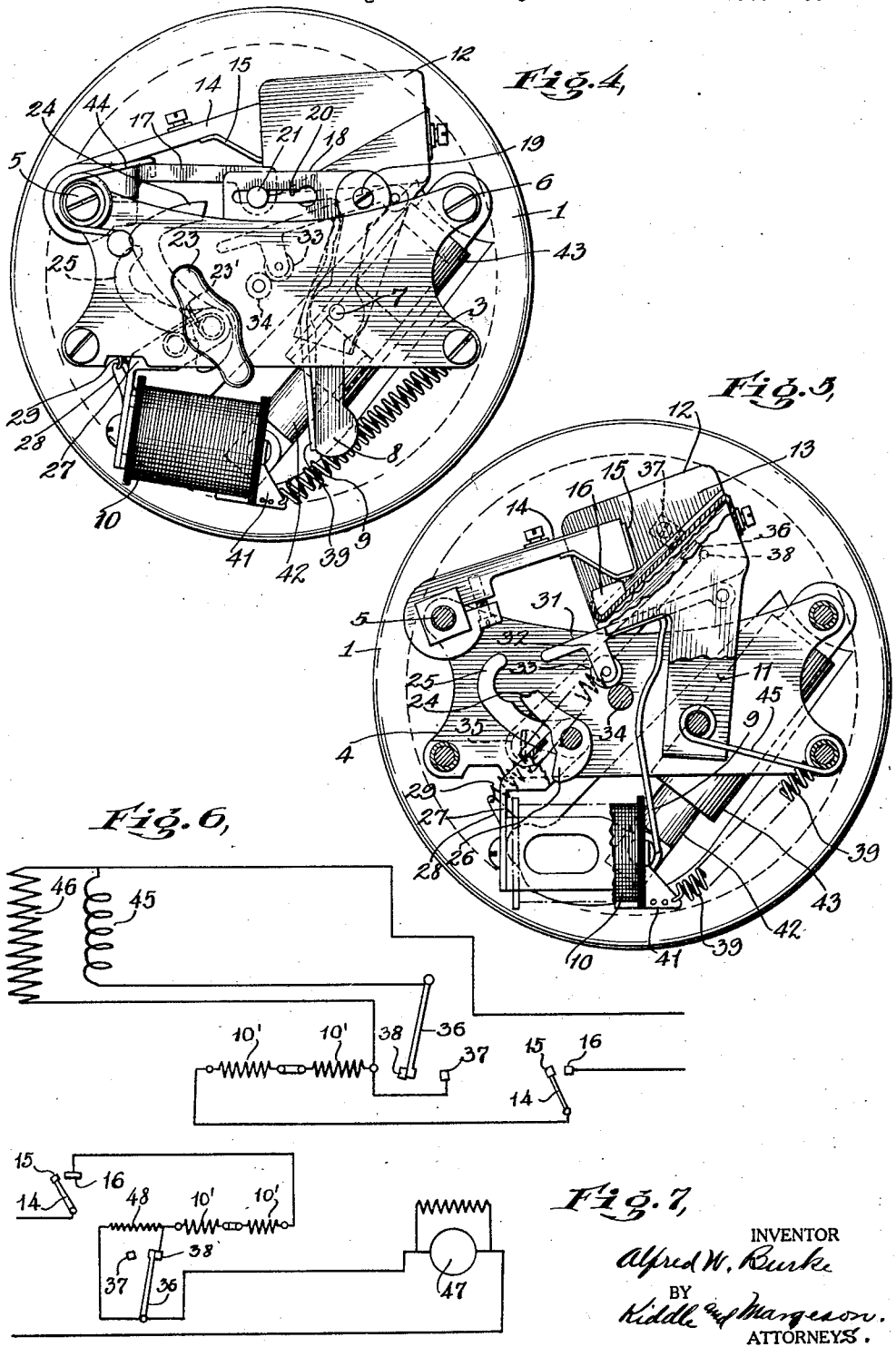

Patented Aug. 21, 1928.

1,681,722

UNITED STATES PATENT OFFICE.

ALFRED W. BURKE, OF PELHAM MANOR, NEW YORK.

CIRCUIT CONTROLLER.

Original application filed August 13, 1921, Serial No. 491,206. Patent No. 1,565,546. Divided and this application filed September 15, 1925. Serial No. 56,429.

My invention relates to electrical apparatus and is adapted for use as a combined motor starter and circuit controller for example, and an object of my invention is the provision of a device which may be employed to great advantage in starting an electric motor, the device functioning automatically to open the motor circuit under abnormal current conditions, as an overload, for example.

The present device although adopted for other uses is well adapted for use in connection with split phase, as well as direct current motors, and when used with split phase motors is capable of being substituted for the usual centrifugal switch employed in connection with such motors. In this connection it may be well to note that my improved device possesses many practical advantages in that the ordinary centrifugal switch employed in connection with split phase motors is built directly into the motor and hence is not accessible for inspection, repairs, etc., whereas the present device which does not rely upon centrifugal force for operation is mounted entirely outside of the motor and hence is accessible at all times for inspection, repairs, replacements, or any other purpose desired.

As another advantage in connection with the use of my device as applied to split phase motors, I may mention that after the starting or auxiliary winding has been cut out of circuit by opening the starting switch, the circuit of this winding cannot be re-established until the main circuit has been opened by opening the running switch.

Briefly, my invention comprises a device in which I have embodied two switches, one of which for convenience I shall term the starting switch and the other of which I shall term the running switch.

In employing this device in connection with split phase motors, for example, the starting switch, of course, controls the usual starting winding of the motor while the running switch controls the current winding. When my device is employed with direct current motors one of these switches is arranged so as to close the circuit to the motor through the usual starting resistance, this resistance being short-circuited within a predetermined time after the other switch has closed.

In the case of split phase motors the circuit to the starting winding is not completed although the starting switch is closed, until the running switch is closed.

The centrifugal switches ordinarily employed with split phase motors possess certain disadvantages which it is an object of this invention to overcome or eliminate: for example, in using the ordinary centrifugal switch in connection with split phase motors it is quite possible that due to heavy load conditions the motor will not come up to sufficient speed to cause the centrifugal switch to function with the result that the motor may drag sufficiently to burn out the starting winding. In the present construction, however, centrifugal force is not relied upon at all for the operation of my improved switch and hence these conditions cannot arise.

In using the usual centrifugal starting switch the starting winding, as above noted, is in circuit both at starting and whenever the motor is sufficiently loaded for the speed to drop down to a point where the centrifugal switch will again close. In the present apparatus, however, as distinguished from this, the starting switch after it has once been opened cannot be closed again unless the running switch is first of all opened.

Viewing my invention from another angle, the starting winding when my device is employed is in circuit during the starting operation only, it being necessary to disconnect the motor from the line before it is again possible to energize both windings. With the centrifugal type of switch it is common practice to have an attendant at the motor when the motor is started so that should the motor fail to start for any reason the attendant may disconnect it but after the motor is running there is usually no attendant present, with the result that should the motor stall due to overload or low voltage, the starting winding will again cut in and may burn out. With my improved switch, however, the arrangement is such that it is impossible for the starting and running switches to remain in circuit at the same time except momentarily, the starting switch opening automatically within a predetermined period and in case of overload the running switch will be opened automatically whether an attendant be present or not.

In the accompanying drawings wherein an embodiment of my improved starting and controlling device has been illustrated,—

Fig. 1 shows the apparatus in side elevation with all the parts in neutral position;

Fig. 2 is a plan view of the apparatus of Fig. 1 with the box in which the apparatus is enclosed shown in section;

Fig. 3 is an elevation showing the parts moved to a position where the starting switch is closed;

Fig. 4 shows the main switch closed;

Fig. 5 shows the parts in position after the apparatus has been automatically tripped so as to open the motor circuit;

Fig. 6 is a wiring diagram showing the application of my improved device to a split phase motor; and Fig. 7 is a wiring diagram showing the application of my device to a direct current motor.

Referring to the drawings in detail, 1 designates a base to which the entire apparatus is attached, the apparatus as a whole, with the exception of a manually operated key by which the mechanism is operated initially being enclosed in a box, 2.

From an inspection of Figures 1 and 2, for example, it will be seen that 3 and 4 designate two plates which are placed apart upon a pair of studs 5 and 6 which are mounted in the base 1. Interposed between the plates 3 and 4 and pivoted upon a stud 7, is a tripping lever 8, the lower end of which is adapted to be moved into engagement with the lower ends of an armature 9 of an electromagnet 10.

Upon the stud 7 above referred to, I pivot also the extension 11 of a block or arm 12. This arm is provided with a slot 13. (See Fig. 2). This slot receives a switch arm 14 carrying a contact 15, this contact being adapted to engage a contact 16 carried in the bottom of the slot 13 in the arm or block 12. The contacts 15 and 16 together constitute a running switch.

The switch arm 14 just mentioned and which carries the contact 15 is pivoted on the stud 5 and is rigid with one arm 17 of a toggle mechanism provided for the purpose of enabling the running switch to be manually operated when desired. This toggle comprises arms 17 and 18, the arm 18 being pivoted on the upper ends of the tripping lever 8 above referred to as indicated at 19. The arm 18 is slotted as indicated at 20 this slot receiving a pin 21 carried by the toggle arm 17. A stud 22 carries the operating key 23 which as above mentioned, is on the exterior of the box 2 and on this same stud I mount a pair of arms 24 and 25. The arm 24 may be termed a toggle operating arm and is rigid with the arm 25 which in turn may be termed a block operating arm. The arm 25 is provided for the purpose of actuating the contact block or contact carrying arm 12 about its pivot 7. This arm or lever 25 is provided with a tail or extension 26 which is adapted to cooperate with a bracket 27 by which the electro-magnet 10 is supported, this bracket being pivoted so that the electromagnet may be moved away from its armature 9 to vary the arm gap between the electromagnet and its armature, as for example, for the position shown in Figure 1, to the position shown in Figure 3.

The magnet supporting bracket 27 is provided with an offset 28 to which is secured a coil spring 29 to the other end of which is fastened a stud 30.

The contact carrying member or arm 12 has pivotally secured to it one end of an electrically controlled locking lever or trigger 31. This locking lever which cooperates with the arm or lever 25 already referred to and with the contact carrying arm 12 is provided adjacent one end with an offset 32 carrying a roller 33 cooperating with a roller or stop 34 mounted on a fixed stud as shown on Figure 4 for example.

A pivot 35 provided within the box 2 carries a starting switch arm 36 adapted to cooperate with a starting contact 37. This starting switch arm carries the stud 30 already referred to, to which one end of the spring 29 is connected. The starting switch is operated to closed position and also to open position by the action of the coil spring 29, as will be presently described, this spring always being in tension. The starting switch arm is limited in its movement to open position by contact 38.

The locking lever or trigger 31 is electrically controlled in that one end of the same is attached to the armature 9 of the electromagnet.

The electromagnet after movement to the left as viewed in Fig. 3 for example, under action with key 23 is returned to position as shown in Fig. 1 by a coil spring 39 one end of which is secured to the base or frame 1 the other end being secured to a bracket 41 which is carried by the electromagnet, this bracket being attached or having attached to it the plunger 42 of a dashpot 43, the chamber of which is pivoted on the stud 6. This arrangement provides electrically operated means the setting of which automatically and continuously varies during a predetermined period, to wit; from the time the electromagnet begins to move from the position shown in Fig. 3 until it has reached the position of Fig. 1.

Having described the details of my improved apparatus, I will now describe a cycle of operation thereof with reference first of all, however, to the wiring diagrams of Figs. 6 and 7: starting with the parts in the position shown in Fig. 1 the operating key 23, which it will be remembered is fixed to the stud 22, is turned first of all in a clock-wise direction as viewed in Fig. 1. This movement of the operating key will actuate the levers 24 and 25 to the right as viewed in Fig. 1 the lever 24 riding beneath the toggle mechanism composed of the arms 17 and 18 as illustrated in Fig. 3. At the same time the member 25 will carry the trigger or locking lever 31 to the right swinging the said arm 12 about its pivot 7 in a clock-wise direction. This movement is continuous until the parts have reached the dotted line of Fig. 3 at which time the roller 33 will have been carried past the center of the roller 34 so as to be locked behind said roller. This same movement of the key 23 has carried the electromagnet 10, that is to say, has moved the same bodily from the position shown in Fig. 1 to that shown in Fig. 3. This movement of the electromagnet placing the spring 39 under tension and also drawing the plunger of the dashpot 43 outwardly.

A short time after the beginning of the bodily movement of the electromagnet 10 to the left, the spring 29, which it will be remembered is attached thereto, will pass above the center of the pivot 35 of the starting switch 36 and inasmuch as this spring is attached to this switch, as above mentioned, and is now under tension, it will snap the starting switch into closed position, that is to say, into engagement with the contact 37. This position of this starting switch is indicated in Fig. 3 in dotted lines.

The key 23 may now be released and its spring 23' will return the key to its original position at the same time returning the levers 24 and 25 to the dotted line position of Fig. 4. As soon as the lever 24, which it will be remembered was previously in engagement with the toggle arm 18, moves out from beneath this arm the toggle will be moved downwardly under the action of the spring 44 carrying with it the switch arm 14 until the contact 15 engages the contact 16 of the switch arm or switch block 12. This closes the running switch composed of the contacts 15 and 16.

The starting switch composed of the contacts 36 and 37 however, is still closed being already closed by the spring 29 attached to the electromagnet 10. At this instant both switches are closed. The electromagnet 10, however, has not yet completed its movement to the right as viewed in Fig. 4 and as soon as the electromagnet has moved sufficiently to carry the spring 29 below the pivotal point of the switch 36, the latter will be snapped to open position.

In order that the application of my improved starting and controlling apparatus to a motor may be understood I shall now proceed to describe its operation in connection with the split phase wiring diagram of Fig. 6. In this diagram 45 designates a starting winding and 46 a running winding of a split phase motor, 10'—10' designate the windings of the electromagnet 10.

Assuming that the parts of the starting and controlling device are in the position shown in Fig. 1 the windings 45, 46 and 10'—10' are all open-circuited. If now, the key 23 be operated as above described, that is to say, in a clock-wise direction as viewed in Fig. 1, the contact carried by the starting switch arm 36 will be moved into engagement with the starting contact 37, the winding 45 still being open circuited and as soon as the key 23 moves in a reverse direction far enough to carry the lever 24 from beneath the toggle arm 17, the running switch 14 will be moved downwardly under the action of the spring 44, carrying the running contact 15 into engagement with the contact 16. The circuit to the starting winding 45 and the running winding 46 is now closed as well as the circuit to the windings 10'—10' of the electromagnet 10. Within a predetermined period, however, that is when the spring 39 has carried the spring 29 below the pivoted point of the switch arm 36, the starting switch will be opened as I have above described, with the result that the starting winding is open-circuited. This is true whether the motor starts or not. Should the motor fail to start, due to overload, for example, or for some other reason, the electromagnet 10 will actuate its armature 9. In this event, of course, as I have above pointed out, the running switch will be opened at the contacts 15 and 16 to open-circuit the running winding 46. As I have also above pointed out, it is impossible for the starting switch to be closed after it has once been opened unless and until the running switch has first been opened. Hence it will be seen that I have provided an apparatus adapted for use in connection with split phase motors wherein initially the starting winding and running winding are both energized, the starting winding being open-circuited within a predetermined period after its circuit has been made, means having been provided whereby the circuit of the starting winding cannot be again closed until the circuit to the running winding has been opened. This, of course, is of great advantage as compared to the usual centrifugal switch for controlling the starting and winding of split phase motors for with such a switch the circuit to the starting winding may never open as in the case of over-load on the motor and may close at any time the motor slows down sufficiently and while the circuit to the running winding is closed.

The main switch will now remain closed until it is opened either manually or automatically, the automatic opening of the main switch being accomplished by an increase in the flow of current in the electromagnet due to over-load for example, which will cause the electromaget to attract its armature 9, drawing the same to the left. Inasmuch as the armature 9 is secured to the locking lever 31, movement of this armature to the left will cause the locking lever to be rocked about its pivot to raise the roller 33 above the roller 34, permitting the spring 45 carried by the extension 11 of the contact carrying block 12 to function to cause the contact carrying block 12 to be rocked about its pivot to open the running switch arm 14 to open position.

It will be seen that now both the starting switch and the running switch are open. It may be desirable, of course, to open the running switch manually instead of automatically, and this may readily be accomplished by merely actuating the key 23 in a clock-wise direction, which will bring the end of the tripping lever 24 into engagement with the end of the toggle arm 18 which, it will be assumed, is in the position shown in Fig. 4. Continued movement of the key 23 in a clock-wise direction will, of course, carry the toggle lever 18 to the right, this movement of the toggle arm with respect to the arm 17 being permitted by reason of the slot 20. The toggle arm 18 will now cause the tripping lever 8 to be rocked about its pivot so as to carry the lower end of this tripping lever to the left into engagement with the armature 9 to cause the latter to move in the same direction as though it had been actuated by the electromagnet 10.

In Fig. 7 I have illustrated a wiring diagram for a direct current motor 47 wherein my apparatus may be employed. When employing my device with a direct current motor the contact 38 is connected to the mains instead of the contact 37. From Fig. 7 it will be seen that when the key 23 is actuated in a clock-wise direction and before the starting switch 36 has been actuated to closed position,—it being remembered now that closed position in connection with the direct current motor is when the switch 36 contacts with the contact 38,—the main switch 14 will be closed. A circuit is now closed to the motor 47 through the windings 10'—10' of the electromagnet 10 and starting resistance 48. As soon however, as the key 23 is released and the spring 39 actuates the starting switch 36 into contact with the contact 38, the starting resistance 48 will be short-circuited.

The motor will continue to run with the switches 36 and 16 closed and the starting resistance 46 cut out as long as may be desired or until some abnormal condition arises, so as to cause the electromagnet 10 to actuate its armature 9. In this event the switch 14 will be open and may not again be closed until the starting switch 36 has been opened.

Here, then, it will be seen that with the parts in neutral position the switch 36 is in engagement with the contact 38 and the switch 14 in open position:—in other words, the switches are in the position shown in Fig. 7. When the key 23 is actuated the switch 36 will be moved away from the contact 38 and soon thereafter the running switch 14 will be closed, the reverse movement of the key 23 causing the switch 36 to be returned to its initial position, that is to say, into engagement with the contact 38 to cut out the starting resistance 48.

It will be seen from the foregoing that I have provided an apparatus wherein two switches are provided, one of which has been termed a starting switch and the other a running switch.

It will be seen furthermore that the starting switch is first of all closed although no circuit is established and that on further operation the running switch is closed, the starting switch thereafter within a predetermined period being automatically opened. The running switch will remain closed until the electromagnet 10 actuates its armature or until the running switch has been manually opened by movement of the key 23 in the manner above described.

It will be seen furthermore that I have provided an apparatus wherein it is impossible to again close the starting switch after the same has been opened unless the running switch 14 has first of all been opened, for the reason that in order that the starting switch may be again closed it becomes necessary for the tail 26 of the lever 25 to be actuated to carry the spring 29 above the center of the pivot of the starting switch but owing to the position of the toggle arms 17 and 18 after the starting switch has once been opened and the running switch closed, this movement of the lever 25 will also carry the lever 24 into engagement with the toggle arm 18 to open the running switch.

It will be seen furthermore that I have provided mechanism whereby the running switch may be opened automatically due to an increase in current in the electromagnet 10 and whereby the running switch may be opened manually at any time desired.

In connection with the application of my device to split phase motors, it will be seen that although the starting switch closes first it is not until the running switch has closed that the circuit is made to the starting winding, and that within a predetermined period the starting winding is open-circuited. In other words, means have been provided whereby the circuit to the starting winding may not remain closed beyond a predetermined period.

It will be seen also that in connection with direct current motors the starting resistance is automatically short-circuited within a predetermined period and the circuit through the starting resistance may not be again closed until the main switch opens.

It is to be understood that changes in the details of construction of my apparatus may be made by those skilled in the art within the purview of my invention.

This application is a division of my Patent No. 1,565,546 dated December 15, 1925.

What I claim is:

1. In an apparatus of the class described, the combination of a starting switch, a running switch, manually operable means for closing said switches, a locking lever for locking the running switch closed, means for opening the starting switch while the locking lever is in operative position and means for preventing closure of the starting switch until said locking lever has been released.

2. In an apparatus of the class described, the combination of a starting switch, a running switch, an electromagnet for controlling said running switch, and operative connection between said electromagnet and said starting switch, means for imparting bodily movement to said electromagnet to cause the said starting switch to close, said means operating at the same time to close said main switch and means for returning said electromagnet to its initial position and at the same time open said starting switch without opening said running switch.

3. In an apparatus of the class described, the combination of a starting switch, and a running switch, an electromagnet, an operative connection between said electromagnet and said starting switch, means for imparting bodily movement to said electromagnet to cause said starting switch to be closed, said means functioning to also close said running switch, means for returning the electromagnet to its initial position, this return of the electromagnet automatically opening said starting switch leaving the running switch closed, and means for retarding the movement of the electromagnet to its initial position.

4. In an apparatus of the class described, the combination of a starting switch and a running switch, both of said switches being pivoted, a pivoted contact carrying member carrying a contact for cooperating with said running switch, toggle mechanism connected to said running switch, a locking lever for said main switch, a tripping lever adapted to cooperate with said toggle mechanism to open the running switch, said tripping lever and toggle mechanism preventing closure of said running switch until the starting switch has been closed.

5. In a device of the character described the combination of an electrically controlled element, an electromagnet and an armature therefor for automatically effecting an actuation of said element and means for bodily moving said electromagnet relatively to its armature.

6. In a circuit controlling device the combination of a switch for closing an electric circuit, an electromagnet and an armature therefor for automatically effecting an opening of said switch, and means for varying the position of said electromagnet relatively of its armature.

7. In a device of the character described, the combination of a switch comprising a pair of contacts, an arm carrying one of said contacts, a trigger attached to said arm, a roller carried by said trigger, a stop member operating with said roller, means for actuating the trigger into position to bring the center of this roller below the center of said stop to maintain said arm in closed switch position and an electromagnet operating with said trigger and adapted under predetermined current conditions to raise said roller to thereby permit said arm to move automatically to open switch position.

8. In a device of the character described, the combination of a switch, a bodily moveable electromagnet and an armature therefor for automatically controlling the operation of said switch and a dashpot connected to said electromagnet for retarding bodily movement of the same with respect to said armature.

This specification signed this 4th day of Sept. 1925.

ALFRED W. BURKE.